United States Patent [19]

Suzuki

[11] Patent Number: 4,754,391

[45] Date of Patent: Jun. 28, 1988

[54] METHOD OF DETERMINING PID PARAMETERS AND AN AUTOMATIC TUNING CONTROLLER USING THE METHOD

[75] Inventor: Shin Suzuki, Yokohama, Japan

[73] Assignee: Yamatake-Honeywell Co. Ltd., Tokyo, Japan

[21] Appl. No.: 905,909

[22] Filed: Sep. 10, 1986

[30] Foreign Application Priority Data

Sep. 18, 1985 [JP] Japan .................................. 60-204503

[51] Int. Cl.$^4$ ............................................. G05B 13/02
[52] U.S. Cl. ...................................... 364/157; 364/162
[58] Field of Search ............... 364/160, 161, 162, 163, 364/157; 318/610, 609

[56] References Cited

U.S. PATENT DOCUMENTS

| | | | |
|---|---|---|---|
| 3,741,474 | 6/1973 | Kawada et al. | 364/162 |
| 3,938,017 | 2/1976 | Hayes | 318/610 |
| 4,214,300 | 7/1980 | Barlow et al. | 318/610 |
| 4,415,966 | 11/1983 | Herzog | 364/161 |
| 4,430,698 | 2/1984 | Harris | 364/162 |
| 4,481,567 | 11/1984 | Kaya | 364/157 |
| 4,549,123 | 10/1985 | Hagglund et al. | 364/162 |
| 4,602,326 | 7/1986 | Kraus | 364/160 |

*Primary Examiner*—Jerry Smith
*Assistant Examiner*—John R. Lastova
*Attorney, Agent, or Firm*—Mitchell J. Halista; Albin Medved

[57] ABSTRACT

A method of determining PID parameters for PID control by a PID controller having proportional, integral and derivative operating portions including the steps of monitoring a limit cycle generated in a controlled process to obtain characteristics of the process, continuing process control in a tuning mode where a nonlinear element is inserted preceding a proportional operation portion and at the same time an integral operation portion is connected in parallel to the series connection of the nonlinear element and the proportional operation portion and the derivative operation portion is removed from operation and determining optimum PID parameters to be used for succeeding process control on the basis of the results of the limit cycle monitoring. A controller utilizing the above method includes a nonlinear element, a switch for inserting the nonlinear element into a stage preceding the proportional operation portion and at the same time connecting the integral operation portion in parallel to the nonlinear element and the proportional operation portion so as to shift control into a tuning mode, a monitoring device for observing a limit cycle generated in the process in the tuning mode, an adjusting apparatus for determining, on the basis of the results of the observation by the monitoring means, optimum PID parameters to be used for process control and for transmitting the parameters to the operation portions, and a control element for actuating the switch to operate upon establishment of predetermined conditions for starting tuning in a normal operation mode and for returing the switch to effect a normal operation mode upon the determination of the PID parameters in the tuning mode.

7 Claims, 4 Drawing Sheets

METHOD OF DETERMINING PID PARAMETERS AND AN AUTOMATIC TUNING CONTROLLER USING THE METHOD

BACKGROUND OF THE INVENTION

1. Field of the Invention

The present invention relates to PID controllers. More specifically, the present invention is directed to a method of determining PID parameters for a PID feedback controller to produce optimum PID control on a controlled process and an automatic tuning controller utilizing the method.

2. Description of the Prior Art

In a conventional feedback process control system, a proportional-plus-integral-plus-derivative (PID) operation is performed with respect to a deviation (e) between a set point (sp) and a controlled variable (pv) fed back from the process, and the result of the PID operation is supplied as a control signal to the process. In order to perform an optimum control of the process, it is necessary that the PID parameters for performing the respective PID operation are set to their optimum values. Conventionally, the PID parameters have been manually adjusted. For implementing the manual adjustment, a step response method and a marginal sensitivity method have been well-known. In both the methods, however, it takes a long time for the measurement of characteristic, and the process control is stopped while the measurement is effected so that the value of pv obtained at that time cannot be the most desirable one.

On the other hand, methods have been proposed in which a nonlinear characteristic is provided in a PID controller so as to generate a limit cycle in a process. In those methods, a controller is arranged in a tuning mode and a nonlinear element is introduced in a signal path so as to effect a discontinuous control operation with respect to a deviation (a two-position control is a typical one). Upon generation of a limit cycle, it has been easy to obtain a characteristic of a process and the optimum parameters for the process on the basis of the waveform of the limit cycle.

In such a method as described above, however, if the values of the two positions of the nonlinear element are large, the range of fluctuation in the control signal corresponding to the nonlinear values becomes so large that the method cannot be used except for some thermal control systems or the like in which a fast response is not required.

On the other hand, the limit cycle has the equilibrium point (sp=pv) of the process as an operating basic point. Accordingly, if the values of the two positions were made small, sometimes the limit cycle could not be generated when a disturbance was generated in the process or the sp changed widely. Furthermore, at that time, the pv undesirably stayed at a point comparatively far from the sp. Consequently, such a conventional controller was inherently inadequate for practical use.

SUMMARY OF THE INVENTION

An object of the present invention is to provide a method of determining PID parameters for optimum PID control.

Another object of the present invention is to provide an automatic tuning controller utilizing the method.

In accomplishing these and other objects, there has been provided, in accordance with the present invention, a method of determining PID parameters in a PID controller having a proportional operation portion, an integral operation portion and a derivative operation portion in which PID control is performed with respect to a deviation between a set point and a controlled variable fed back from a process to obtain a manipulated variable which is in turn transmitted to said process including the steps of monitoring a limit cycle generated in a process to obtain characteristics of the process, continuing process control in a tuning mode after a nonlinear element is inserted preceding the proportional operation portion and in series therewith and at the same time the integral operation portion is connected in parallel to the series connection of the nonlinear element and the proportional operation portion and the derivation operation portion is removed from operation, and optimum PID parameters to be used for succeeding process control are determined on the basis of the results of the monitoring of the limit cycle during the tuning mode. A controller utilizing the above method includes a nonlinear element comprises a nonlinear element, a switch for inserting the nonlinear element into a stage preceding the proportional operation portion and at the same time connecting the integral operation portion in parallel to the nonlinear element and the proportional operation portion so as to shift control into a tuning mode, a monitoring device for observing a limit cycle generated in the process in the tuning mode, an adjusting apparatus for determining, on the basis of the results of the observation by the monitoring means, optimum PID parameters to be used for process control and for transmitting the parameters to the operation portions, and a control element for actuating the switch to operate upon establishment of predetermined conditions for starting tuning in a normal operation mode and for returning the switch to effect a normal operation mode upon the determination of the PID parameters in the tuning mode.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1A:
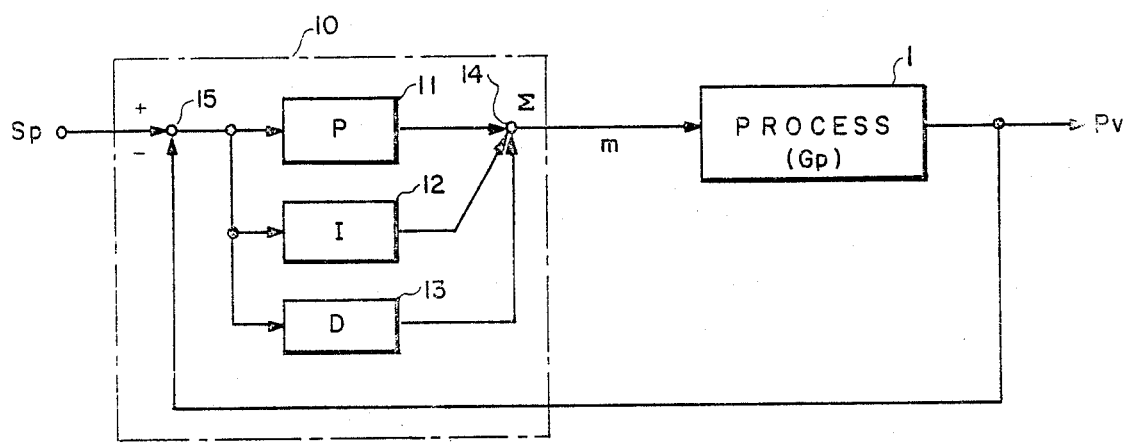
FIG. 1A is a block diagram of an example of an embodiment of the present invention illustrating a controller in a normal operation mode.

Referring to FIG. 1A in more detail there is shown, in a normal operation mode, a controller 10 constituted by a proportional operation portion 11, an integral operation portion 12, a derivative operation portion 13, an output portion 14 for supplying to a process 1 a manipulated variable "m" obtained by addition of outputs of these operation portions, and an input portion 15 for applying to the operation portions a deviation "e" between a controlled variable "pv" fed back from the process 1 and a set point "sp."

Generally, the manipulated variable "m" can be obtained by:

$$m = K\left(e + \frac{1}{T_i}\int e\, dt + T_d \frac{de}{dt}\right) \quad (1)$$

where K, $T_i$, and $T_d$ are proportion gain, integration time, and derivation time, respectively, which are generically referred to as "PID parameters". In the equation (1), the first, the second, and the third terms on the right side represent the outputs due to the proportional operation, the integral operation, and the derivative operation, respectively. Various modifications, for example, eliminating the derivative term (PI control) or applying the proportional-plus-integral term only to the controlled variable pv (IPD control), may be resorted in accordance with the characteristics of the process and the purpose of the control. Such control operations are generically referred to as "PID control".

As described above, the controller 10 performs a general PID control in the normal operation mode. In the present invention, however, the controller 10 determines the optimum PID parameters in a tuning mode while continuing the control operation and then returns to the normal operation mode with the obtained new optimum parameters. The method of determining the PID parameters will be described in detail hereinafter.

Figure 1B:
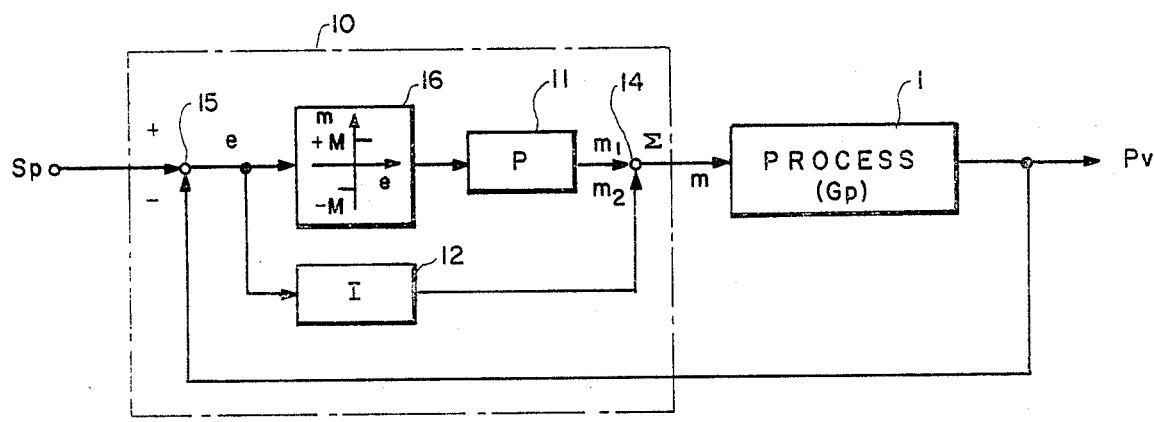
FIG. 1B is a block diagram of the controller shown in FIG. 1 in a tuning mode for determining PID parameters.

The controller 10 is shifted into the tuning mode upon a reception of an external instruction to perform tuning or upon a self-detection of an abnormal state of the "pv", or the like. In the tuning mode, as shown in FIG. 1B, the controller 10 is arranged such that a nonlinear element 16 is inserted into the controller 10 preceding the proportional operation portion 11 and in series therewith and the integral operation portion 12 is connected in parallel to the series connection of the nonlinear element 16 and the proportional operation portion 11. Consequently, referring to equation 1 above, K and $T_i$ are retained, and $T_d$ is made zero, so as to eliminate the derivative operation.

Figure 3:
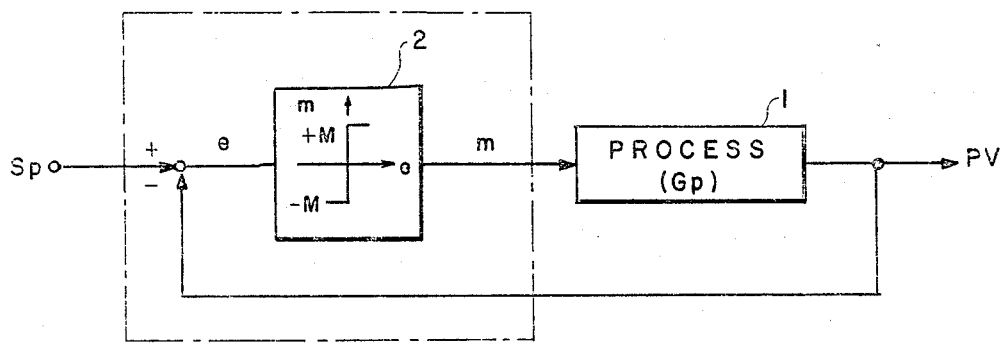
FIG. 3 is a block diagram illustrating an example of a nonlinear element control system.

A 2-position nonlinear element which may be the same as the example of a nonlinear element 2 shown in FIG. 3 is used as the nonlinear element 16 shown in FIG. 1B. The nonlinear element 16 is used to cause the process to generate self-oscillation (a so-called limit cycle) whereby a monitoring of the limit cycle enables a detection of the characteristics of the process as a result of the tuning.

Figure 4:
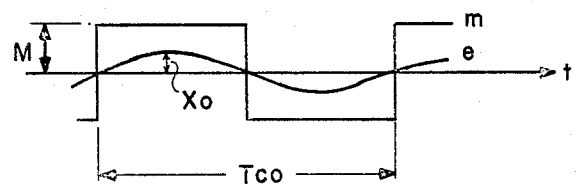
FIG. 4 is a diagram illustrating a limit cycle generated by the system shown by in FIG. 3.
Figure 5:
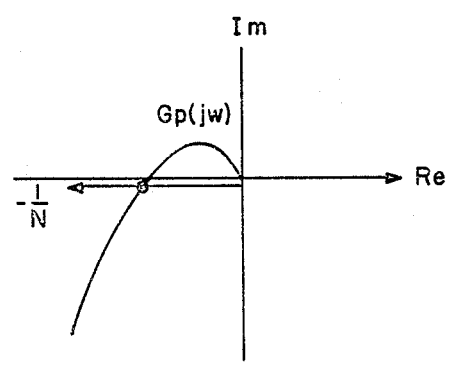
FIG. 5 is a Nyquist diagram showing a characteristic of the control system shown in FIG. 3.

The position of generation of the limit cycle in the arrangement shown in FIG. 3 (hereinafter referred to as an ideal limit cycle) is an intersection of the transfer function Gp (jω) of the process as shown in FIG. 5 and the diagram of $-1/N$ calculated from the describing function $N(X,\omega)$ of the nonlinear element. The intersection is a point of Gp (jω) at a phase of $-180°$, and therefore important in view of determination of the optimum PID parameters. This is because the conventional marginal sensitivity $K_c$ and the oscillation period $T_{co}$ at that time can be obtained through the following equations on the basis of the amplitude $X_o$ and period $T_{co}$ obtained through the observation of such an ideal limit cycle as shown in FIG. 4:

$$K_c = 4M/\pi X_o \quad (2)$$

$$T_{co'} = T_{co} \quad (3)$$

As described above, it is however difficult to obtain these data directly from the actual process with the process control continuing in operation.

Figure 2:
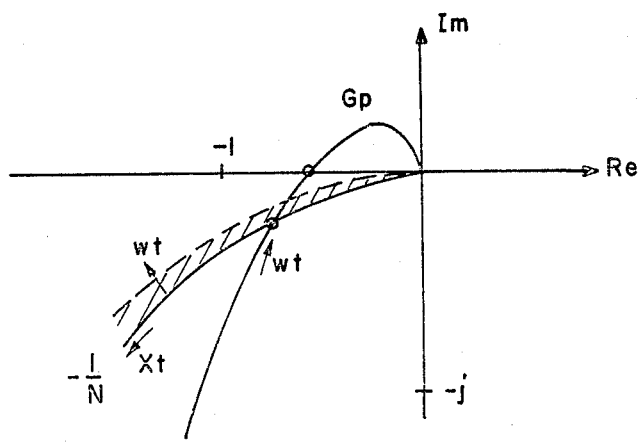
FIG. 2 is a Nyquist diagram showing the generation points of a "limit cycle" generated by the controller of FIGS. 1A and B in the tuning mode.

According to the present invention, therefore, a limit cycle is generated in the arrangement of FIG. 1B so as to obtain data of the generation point of an ideal limit cycle on the basis of the data of the generation point of the limit cycle at that time. In FIG. 2, the Nyquist diagram of the value $-1/N$ is obtained from the describing function $N(X,\omega)$ of the controller 10 when $T_i$ is set to a suitable value. This will be described hereunder.

First, the transfer function Gp(s) (where s is a Laplace operator) showing the characteristic of the process is approximated by the following equation in view of the motion from its equilibrium point:

$$Gp(s) = e^{-LS}/TS \quad (4)$$

where L represents delay time and T represents response slope.

On the other hand, the generated limit cycle is approximated with a sine curve by the following equation:

$$e = x \sin t \quad (5)$$

Because the describing function of the nonlinear element having a two-position nonlinear characteristic as described above is $4M/\pi X$, the respective outputs $m_1$ and $m_2$ of the proportional operation portion 11 and the integral operation portion 12, and the manipulated variable "m" are expressed by the following equations, respectively:

$$m_1 = \frac{4KM}{\pi} \sin\omega t \quad (6)$$

$$m_2 = \frac{-KX}{T_i\omega} \cos\omega t \quad (7)$$

$$m = m_1 + m_2 \quad (8)$$

When the oscillation component of the controlled variable is represented by $e_o$, the following equations are derived from the equations (4) and (8):

$$e_o = -\frac{4KM}{T_c\omega\pi} \sqrt{1 + \left(\frac{\pi}{4M} \cdot \frac{X}{T_i\omega}\right)^2} (\cos(\omega(t - L) - \phi)) \quad (9)$$

$$\phi = \tan^{-1}\left(\frac{\pi}{4M} \cdot \frac{X}{T_i\omega}\right) \quad (10)$$

Because the deviation $e=e_o$, the following equations are derived from the equations (5) and (9):

$$X = \frac{4KM}{T_c\omega\pi} \sqrt{1 + \left(\frac{\pi}{4M} \cdot \frac{X}{T_i\omega}\right)^2} \quad (11)$$

$$\omega = \left(\frac{\pi}{2} - \tan^{-1}\left(\frac{\pi}{4M} \cdot \frac{X}{T_i\omega}\right)\right)/L \quad (12)$$

The angular frequency is transformed into period $T_c$ by the equality $=2/T_c$, as follows:

$$T_c = 2\pi L / \left(\frac{\pi}{2} - \tan^{-1}\left(\frac{\pi}{4M} \cdot \frac{X}{T_i\omega}\right)\right) \quad (13)$$

Those values can be obtained through calculation, however, L and T per se of the process are of course unknown.

If also the integral operation can be eliminated in the arrangement of FIG. 1B (that is, $T_i=\infty$), the limit cycle at this time is an ideal limit cycle:

$$e = X_o \sin \omega_o t \quad (14)$$

$$X_o = \frac{4KM}{T\omega_o\pi} \quad (15)$$

When the period is $T_{co}(=2\pi/\omega_o)$, the following equation is obtained:

$$T_{co} = rL \quad (16)$$

Instead of obtaining L and T of the process, $X_o$ and $T_{co}$ can be easily derived from the equations (11) and (13) and the equations (15) and (16), respectively:

$$X_o = aX \quad (17)$$

$$T_{co} = aT_c \quad (18)$$

$$a = 1 - \frac{X T_c}{4\pi M T_i} \quad (19)$$

In the derivation of the equations (17) and (19), an approximation is made with the equality $\tan^{-1}=\vartheta$ (where $\vartheta$ is a sufficiently small angle). The approximation is sufficiently effective when the system is stable (that is, when the value of $\pi/4M.X/T_i\omega$ is sufficiently small).

From the description made above, it has been proved that the data of an ideal limit cycle can be obtained through calculation on the basis of the observation data X and $T_c$ of a limit cycle generated in the arrangement of FIG. 1B.

$K_c$ and $T_{co}$ can be obtained as follows by substituting the values of $X_o$ and $T_{co}$ obtained as above into the equations (2) and (3) (a proportional gain K is added in the equation [2]):

$$K_c = 4KM/\pi X_o = 4KM/\pi aX \quad (20)$$

$$T_{co}' = T_{co} = aT_c \quad (21)$$

The optimum PID parameters can be obtained on the basis of the thus obtained $K_c$ and $T_{co}$, through a well known method, for example, a Ziegler and Nicols' method, as shown in the following table.

| Control operation | PID parameters | | |
|---|---|---|---|
| | K | $T_i$ | $T_d$ |
| PI | 0.45 $k_c$ | 0.83 $T_{co}'$ | — |
| PID | 0.6 $k_c$ | 0.5 $T_{co}'$ | 0.125 $T_{co}'$ |

Alternatively, it is easy to obtain the L and T showing the process characteristic by using the equation (15) and (16).

The describing function N of the controller 10 in the arrangement of FIG. 1(b) is expressed by the following equation:

$$N = K\left(\frac{4M}{\pi X} + \frac{1}{j\omega T_i}\right) \quad (22)$$

In FIG. 2, there shown is a Nyquist diagram of $-1/N$ when $T_i$ takes a suitable value obtained by the equation (22). Generally, the limit cycle is stable when the locus of amplitude passes through the locus of frequency as shown in the drawing from the inside toward the outside.

In the control system shown in FIGS. 1A and 1B, the controller 10 operates to eliminate the deviation "e", that is, it operates to maintain the closed-loop control system utilizing feedback in the tuning mode. In this mode, the integral operation portion 12 effectively operates to change the basic point by self-oscillation owing to the nonlinear element 16 to thereby make it possible to eliminate the deviation "e" even in the case where a disturbance occurs in the process or "sp" is widely changed to make the value of M so small that the elimination cannot be followed by the nonlinear element 16. In other words, it becomes possible to make M of the nonlinear element 16 small and to ensure rapid response in the tuning mode.

After the characteristic of the process and the optimum PID parameters are easily obtained from the amplitude X and and period $T_c$ is obtained from the observation of the thus generated limit cycle and an interior constant of the controller 10 at that time, the controller 10 returns into the normal operation mode as shown in FIG. 1A with the obtained new PID parameters.

The arrangements of the respective operation portions, that is, the proportional, integral, and derivative operation portions, the nonlinear element, the input and output portions, the control element for changing-over the operation mode between the normal operation one and the tuning one, the apparatus for observing waveforms of a limit-cycle generated in the process in the tuning mode, the device for obtaining X and $T_c$ from the observed results, calculating $K_c$ and $T_{co}$, and obtaining new PID parameters from the obtained $K_c$ and $T_{co}$, etc., are not limited by the foregoing embodiment. That is, those functions may be separately realized by individual constituent elements or devices, or may be realized through an execution of a program stored in a memory beforehand and using a microcomputer.

In reference to that, the algorithm for obtaining X and $T_c$ from through the observation of waveforms and the relation for connecting $K_c$ and $T_{co}$ with the optimum PID parameters are not limited by the foregoing description, and the use of the above-mentioned Ziegler and Nicols' method is but one example of them.

As described above, according to the present invention, only the optimum PID parameters can be easily obtained from the results of monitoring of the limit cycle operating with a nonlinear element, but the feedback control of a process can be effectively maintained while the optimum PID parameters are being obtained to thereby make it possible to continue the optimum control while suitably renewing the PID parameters without breaking continuity of the control.

Figure 6:
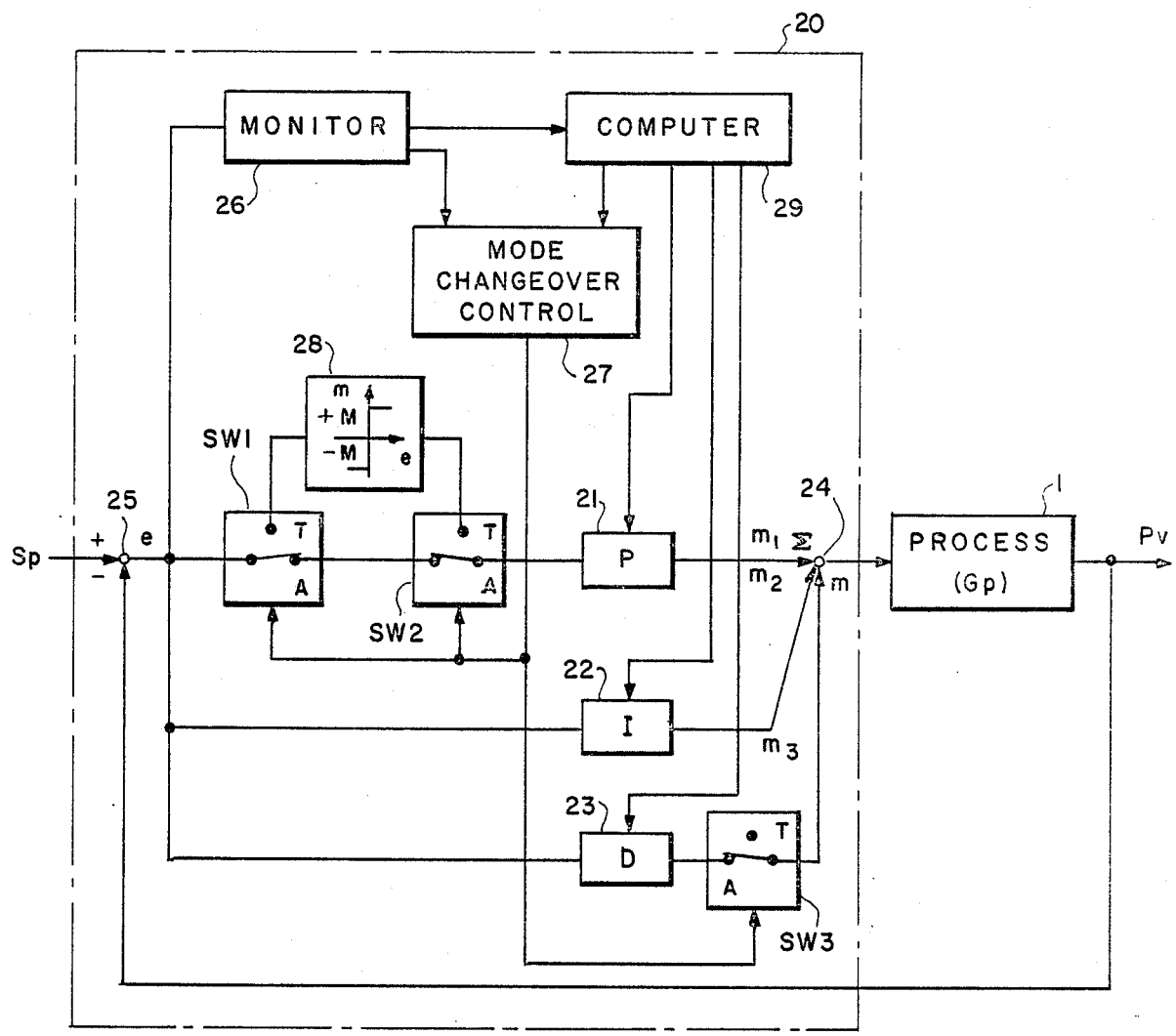
FIG. 6 is a block diagram of an example of an embodiment of a controller using the method of the present invention, FIGS. 7A and B are diagrams showing "limit cycles" generated in the tuning mode by the controller shown in FIG. 6.

FIG. 6 is a block diagram showing an embodiment of an example of a controller using the method of the present invention. Referring to FIG. 6, an automatic tuning controller 20 includes three switches SW1, SW2 and SW3. These switches are linked with each other to be concurrently changed over between the normal operation mode in which each switch is turned to an A (Auto) side and the tuning mode in which each switch is turned to a T (Tuning) side.

The controller 20 has a proportional operation portion 21, an integral operation portion 22, a derivative operation portion 23, an output portion 24 for applying to a process 1 a manipulated variable "m" obtained by addition of outputs of these operation portions, and an input portion 25 for applying to the operation portions a deviation "e" between a controlled variable "pv" fed back from the process 1 and a set point "sp". In the normal operating mode, the controller 10 provides the manipulated variable "m" expressed by the above equation (1). In the equation (1), the first, the second, and the third terms on the right side represent an output $m_1$ of the proportional operation portion 21, an output $m_2$ of the integral operation portion 22, and an output $m_3$ of the derivative operation portion 23, respectively.

As described above, the controller 20 performs general PID control in the normal operation mode in which a monitor 26 monitors the motion of the deviation "e". Upon establishment of a predetermined condition for starting tuning, that is, for example when the absolute value of the deviation monitored by the monitor 26 exceeds a predetermined value, the response characteristic becomes poor, or the like, a mode change-over control portion 27 turns each of the switches SW1–SW3 to its T side to thereby shift the controller 20 into the tuning mode.

In the tuning mode, a nonlinear element 28 having a two-position nonlinear characteristic is inserted into the controller 20 preceding the proportional operation portion 21 and in series therewith, concurrently, the integral operation portion 22 is connected in parallel to the series connection of the nonlinear element 28 and the proportional operation portion 21. Consequently, K and $T_i$ are left as they are and $T_d$ is made zero, so that the derivative operation is eliminated, and the manipulated variable becomes the sum of the respective outputs as expressed by the following equations:

$$m_1 = \pm K \cdot M \tag{22}$$

where the sign corresponds to that of "e":

$$m_2 = K \cdot \frac{1}{T_i} \int e \, dt \tag{23}$$

At this time, the operation of the controller 20 to eliminate the deviation "e" remains unchanged. Accordingly, the feedback control system of the process is still maintained.

Figure 7A:
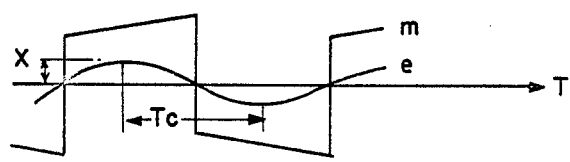
Figure 7B:
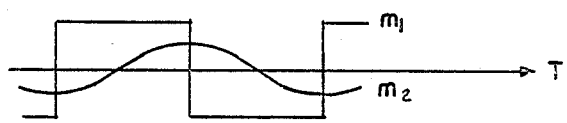
Figure 8:
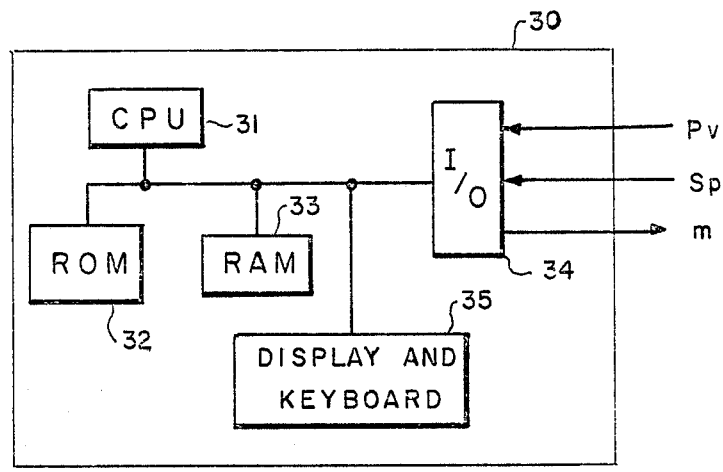
FIG. 8 is a block diagram of controller constituted by a digital microcomputer for use with the present invention and FIGS. 9 and 10 are flow charts of a digital computer program utilizing the method of the present invention for use with the controller shown in FIG. 8.

The state of the waveforms of the manipulated variable "m", the deviation "e", and the outputs $m_1$ and $m_2$ of these two operation portions are shown in FIG. 7. The monitor 26 determines whether the oscillation of $m_2$ is sufficiently smaller than that of $m_2$ or whether the oscillation of "e" is sufficiently smaller than that of "m". When these two conditions are not satisfied, K is reduced and $T_i$ is enlarged through the computer adjuster 29. This operation is important for maintaining the process in a safety state in the case where K and $T_i$ are abnormal, and particularly, in the case where it is impossible to know what are suitable values of the parameters in the starting operation.

When the monitored motions satisfy the above-mentioned conditions, the monitor 26 awaits until the oscillation of the deviation "e" becomes a stable sustained oscillation, then transmits the amplitude X and the period $T_c$ of the oscillation, to the computer adjuster 29.

In the computer adjuster 29, through the following operations, conventional critical sensitivity $K_c$ and oscillation period $T_{co}$, time are easily calculated, as follows:

$$K_c = 4KM/\pi aX \tag{24}$$

$$T_{co}' = aT_c \tag{25}$$

$$a = 1 - \frac{X \cdot T_c}{4\pi M T_i} \tag{26}$$

In these equations, M represents the values of two positions in the nonlinear element 28. The reason why $K_c$ and $T_{co}$, are expressed by the above equations, will be described hereinafter.

FIG. 2 is a diagram showing generation points of limit cycle. In the drawing, the reference symbol A shows a transfer function $Gp(j\omega)$ of the process, and the reference symbol B shows a Nyquist diagram of $-1/N$ calculated from a describing function $N(X,\omega)$ of the controller 10 where $T_i$ is taken to a suitable value. An intersection of A and B, shown by an open circle in the drawing, is a generation point of the limit cycle, and a point of Gp at a phase of $-180°$, shown by a solid circle in the drawing, is a generation point of the limit cycle in a control system constituted by a nonlinear element 18 and a proportional operation portion 11 (referred to as an 'ideal limit cycle'). If the amplitude $X_o$ and period $T_{co}$ of the ideal limit cycle could be obtained, $K_c$ and $T_{co}$, could be obtained by the following equations:

$$K_c = 4KM/\pi X_o \tag{27}$$

$$T_{co}' = T_{co} \tag{28}$$

As described above, it is however difficult, to obtain these data directly from the actual process with the process control being continued. Therefore, the present invention is designed to obtain the data of the generation point of the ideal limit cycle from the data as to the generation point of the limit cycle in the tuning mode.

Thus, the above-described equations (24) to (26) are derived by substituting these ideal limit cycle data $X_o$ and $T_{co}$ into the equations (27) and (28). The adjuster 29 further calculates optimum PID parameters on the basis of $K_c$ and $T_{co}$, obtained from the equations (24) and (25) as described above and transmits the optimum PID parameters to the respective operation portions. In the case where K and $T_i$ have been already almost suitable values, that is, in the case where a stable normal operation is continued, the value of α in tuning is often about "1". In this case, calculating speed for the equations (24) and (25) is improved. After the determination of the PID parameters, the mode changeover control circuit 17 returns the switches SW1-SW3 to perform the normal operation by use of the renewed PID parameters.

The controller 20, as described above, operates to eliminate the deviation "e", that is, operates while maintaining the closed-loop control system owing to feedback, in the tuning mode. In this mode, the integral operation portion 22 effectively operates to change the basic point in an oscillation owing to the nonlinear element 28 to thereby make it possible to eliminate the deviation "e" even in the case where a disturbance occurs whereby the process or "sp" is widely changed to make the value of "M" so small that the elimination cannot be followed by the nonlinear element 28. In other words, because the value of "M" in the nonlinear element 28 is small, e.g., from 1% to 10% of the whole moving area (span) of the manipulated variable, the changes transmitted to the process 1 in the runing mode are so little that a quick response can be maintained.

Such a controller 20 can be realized by using a microcomputer and executing a program stored in a memory beforehand. On the other hand, the respective portions, that is, the proportional integral and derivative operation portions 21, 22, 23, the nonlinear element 28, the input and output portions, the switches SW1-SW3 and the control portion, the monitor 26, the adjuster 29, etc., may be separately constituted by individual devices.

FIG. 6 shows an example using a microcomputer 30, including a central processor unit 31 (CPU) such as a mocroprocessor or the like, a read only memory (ROM) 32, a random access memory (RAM) 33, an input-output port 34, and a keyboard/display unit 35 having setup operators for various constants or the like, and a display. The CPU 31 executes in time series a program stored in the read only memory 32 beforehand to thereby perform a function as a controller 20. This will be described with reference to FIGS. 9 and 10.

Figure 9:
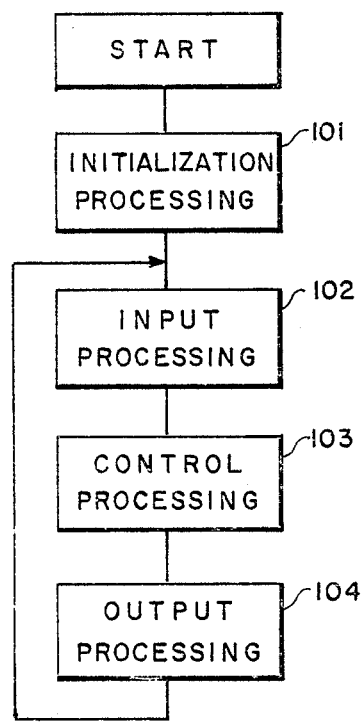

FIG. 9 is a flow chart showing an example of a main program processed in the CPU 31. In the drawing, the CPU 31 performs initialization processing (step 101), and then performs input processing (step 102) through the input-output port 34, that is, fetches both of the set point "sp" transmitted from the keyboard/display unit 35 and the controlled variable "pv" fed back from the process 1 through an analog-to-digital conversion. Next, the CPU 31 performs control operation processing to determine the manipulated variable "m" (step 103), and performs output processing (step 104) through the input-output port 34, that is, applies the manipulated variable "m" to the process 1 through a digital-to-analog conversion. The above-mentioned steps from the input processing 102 to the output processing 104 are repeated with a predetermined sampling period.

Figure 10:
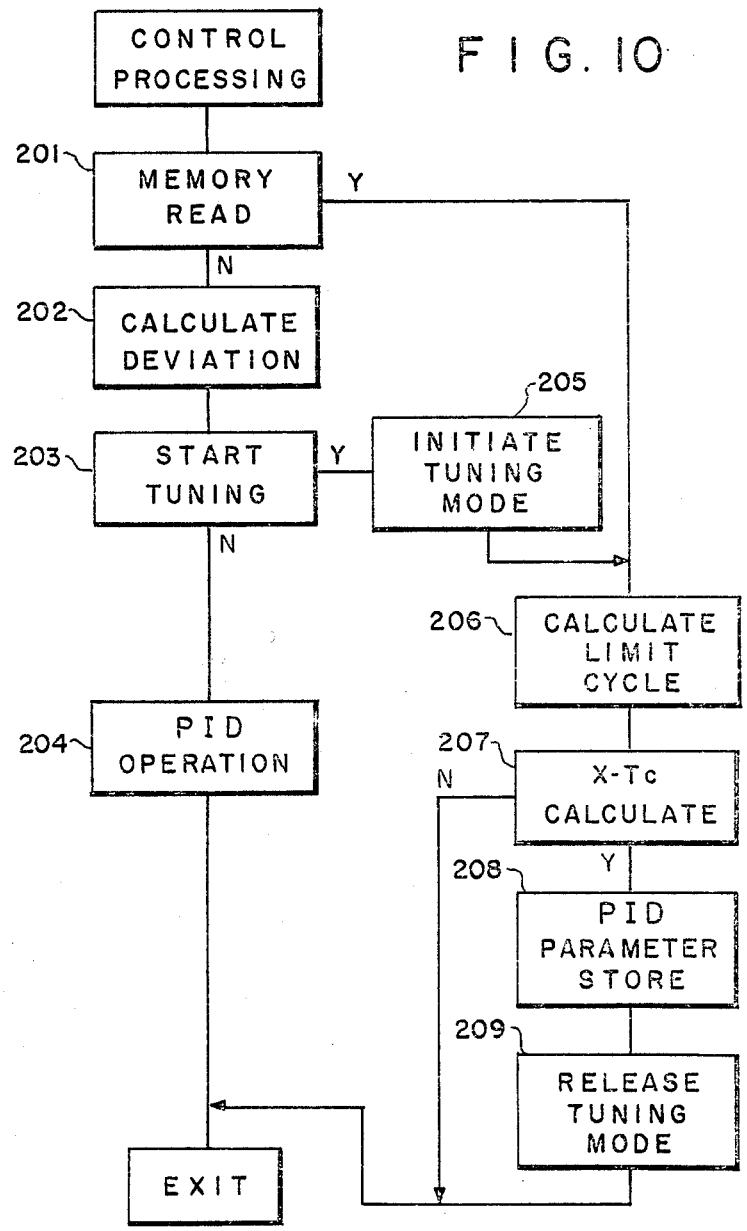

FIG. 10 is a flow chart showing an example of a program for the control operation processing. When the execution of program is shifted to the control operation processing, the CPU 31 judges whether the state is in the tuning mode or not on the basis of a flag set in a predetermined area of the random access memory 33 (step 201). If not in the tuning mode, the CPU 31 calculates the deviation "e" between the set point "sp" and the controlled variable "pv" (step 202), and judges whether a predetermined condition for starting tuning is satisfied or not (step 203). If the condition is not satisfied, the CPU 31 calculates the manipulated variable "m" through a normal PID operation by use of the new PID parameters stored in a predetermined area of the random access memory 33 (step 204). This step is equivalent to the case where the switches SW1-SW3 are turned to the A side in FIG. 6.

On the other hand, if the condition for starting tuning is satisfied (step 203), the CPU 31 sets up the tuning mode (step 205) and calculates the limit cycle on the assumption that the nonlinear element 28 is inserted into the stage preceding the proportional operation portion 21 and that the integral operation portion 22 is connected in parallel to the series connection of the nonlinear element 28 and the proportional operation portion 21 (step 206). At the same time, the manipulated variable "m" is calculated. When X and $T_c$ of the equations (11) and (13) are calculated from the limit cycle (step 207) (that is, when the limit cycle becomes stable), the optimum PID parameters are further determined on the basis of those data, for example, according to the Ziegler and Nicols' method as described above, to thereby renew the PID parameters stored in the predetermined area of the random access memory 33 (step 208). Thereafter, the tuning mode is terminated (step 209). Subsequently, in the execution of the next PID operation step 204, an operation is performed on the basis of those new PID parameters. Thus, the optimum control is maintained while properly renewing the PID parameters.

Although the embodiment shows the case where the control is automatically shifted into the tuning mode in accordance with the condition of the deviation "e" being monitored, the operation of renewing the PID parameters may be performed at regular intervals in accordance with another condition for starting tuning, for example, a lapse of a predetermined time. Furthermore, for example, a function for shifting the control state into the tuning mode at any time in response to an operation input from the keyboard/display unit 35 may be added.

As described above, according to the present invention, an automatic tuning controller which is usable even for a process requiring rapid response can be put in practice with low cost, because the controller is provided with a nonlinear element, a switch for inserting the nonlinear element into a stage preceding the proportional operation portion and at the same time connecting the integral operation portion in parallel to the series circuit of the nonlinear element and the proportional operation portion so as to shift control into a tuning mode, a monitor for observing a limit cycle generated in the process in the tuning mode, an adjuster for determining, on the basis of the results of observation by the observer, optimum PID parameters to be used for process control and for transmitting the parameters to the operation portions, and a control apparatus for actuating the switch to operate upon establishment of predetermined conditions for starting tuning in a normal operation mode and for returning the switch upon the determination of the PID parameters in the tuning mode.

Accordingly, the conventional expensive automatic adjusting unit or the like is unnecessary. Furthermore, compared with the conventional automatic adaptation type controller, the present controller is simple in structure, and even when the controller is realized by a computer, there is no necessity to increase a memory storage capacity because of the simplified calculation needed by the present controller. The changes in the manipulated variable transmitted to the process for tuning are small, and the sampling time is equivalent to that of an ordinary DDC (direct digital controller).

In addition, in use, the controller may be simply dealt with merely in such a manner that the PID parameters are set to suitable initial values (which may be slightly excessive), the set values are suitably manually adjusted, and then the control state is changed over into the normal operation mode. The controller according to the present invention performs normal PID control in a normal operation, however, for example, when the deviation exceeds a predetermined value, the controller is automatically shifted into a tuning mode in which PID parameters are renewed to perform optimum control for the process, and thereafter the controller is returned into the normal operation in which the renewed parameters are used. Also in the tuning mode, the feedback control of the process is maintained.

Accordingly, it may be seen that there has been provided, in accordance with the present invention, a method for determining PID parameters for a PID controller to produce optimum PID control on a controlled process and an automatic tuning controller utilizing the method.

The embodiments of the present invention in which an exclusive property or privilege is claimed are defined as follows:

1. A method of determining PID parameters in a PID controller having a proportional operation portion, an integral operation portion and a derivative operation portion in which PID control is performed with respect to a deviation between a set point and a controlled variable fed back from a process to obtain a manipulated variable which is in turn transmitted to said process including the steps of
monitoring a limit cycle generated in said process to obtain characteristics of said process,
continuing process control in a tuning mode after a nonlinear element is inserted preceding said proportional operation portion and in series therewith while at the same time said integral operation portion is connected in parallel to the series connection of said nonlinear element and said proportional operation portion and said derivative operation portion is removed from operation and
determining optimum PID parameters to be used for succeeding process control on the basis of the results of the limit cycle monitoring during the tuning mode.

2. A method as set forth in claim 1 and including the further steps of removing the nonlinear element and continuing the process PID control utilizing the optimum PID parameters.

3. An automatic tuning controller comprising
operation portions for performing proportional, integral and derivative operations with respect to a deviation between a set point and a controlled variable fed back from a process, and an output portion for supplying to the process a manipulated variable obtained by addition of the results of said operation portions,
a nonlinear element,
switching means for inserting said nonlinear element preceding said proportional operation portion and in series therewith and at the same time connecting the integral operation portion in parallel to the series connection of said nonlinear element and said proportional operation portion while the operation of said derivative operation portion is interrupted so as to shift control into a tuning mode,
monitoring means for observing a limit cycle generated in said process in said tuning mode,
adjuster means for determining on the basis of the results of observation by said monitoring means optimum PID parameters to be used for process PID control and for transmitting said parameters to said operation portions and
control means for actuating said switching means to operate upon establishment of a predetermined condition for establishing a tuning mode from a normal operation mode and for returning said switching means to said operation mode upon the determination of said optimum PID parameters in said tuning mode.

4. A controller as set forth in claim 3 where said adjuster means includes a digital computer having a stored algorithm for operating upon the results of said observations by said monitoring means.

5. A controller as set forth in claim 3 wherein said switching means includes a pair of switches arranged to insert said nonlinear element into a signal line supplying a setpoint signal to said proportional operation portion.

6. A controller as set forth in claim 5 wherein said switching means includes a third switch for providing said parallel connection of said integral operation portion.

7. A controller as set forth in claim 3 wherein said predetermined condition is the attainment of a predetermined value by an absolute value of said deviation.

* * * * *